US012033781B2

(12) United States Patent
Stark

(10) Patent No.: US 12,033,781 B2
(45) Date of Patent: Jul. 9, 2024

(54) CORE FOR INDUCTIVE ELEMENT, AND INDUCTIVE ELEMENT

(71) Applicant: Würth Elektronik eiSos GmbH & Co. KG, Waldenburg (DE)

(72) Inventor: Markus Stark, Krautheim (DE)

(73) Assignee: Würth Elektronik eiSos GmbH & Co. KG, Waldenburg (DE)

( * ) Notice: Subject to any disclaimer, the term of this patent is extended or adjusted under 35 U.S.C. 154(b) by 308 days.

(21) Appl. No.: 16/967,011

(22) PCT Filed: Oct. 9, 2019

(86) PCT No.: PCT/EP2019/077405
§ 371 (c)(1),
(2) Date: Aug. 3, 2020

(87) PCT Pub. No.: WO2020/083651
PCT Pub. Date: Apr. 30, 2020

(65) Prior Publication Data

US 2021/0383957 A1 Dec. 9, 2021

(30) Foreign Application Priority Data

Oct. 22, 2018 (DE) ......................... 102018218042.3

(51) Int. Cl.
*H01F 27/26* (2006.01)
*H01F 27/24* (2006.01)

(52) U.S. Cl.
CPC .................................... *H01F 27/24* (2013.01)

(58) Field of Classification Search
CPC ...... H01F 27/24; H01F 27/266; H01F 27/346; H01F 3/12; H01F 17/04; H01F 27/32; H01F 27/323; H01F 27/324; H01F 2005/046; H01F 27/325
See application file for complete search history.

(56) References Cited

U.S. PATENT DOCUMENTS 4,565,988 A 1/1986 Moura et al.
5,694,105 A * 12/1997 Weiner ...................... H01F 5/04 336/208
6,762,656 B1 7/2004 Kobayashi et al.
(Continued)

FOREIGN PATENT DOCUMENTS

CN 102163489 A 8/2011
CN 104966604 A 10/2015
(Continued)

*Primary Examiner* — Mang Tin Bik Lian
(74) *Attorney, Agent, or Firm* — Boyle Fredrickson S.C.

(57) ABSTRACT

The invention concerns a core for an inductive element with at least a first side part, a middle part and a second side part, wherein the middle part has a central portion, a first edge portion arranged parallel to the central portion, and a second edge portion arranged parallel to the central portion, wherein the central portion is arranged between the first and second edge portions, wherein at least one plastic component is provided which is provided at least between the central portion and the first edge portion and/or at least between the central portion and the second edge portion, in order to adjust a stray capacitance of the inductive element and influence a secondary magnetic flux of the inductive element.

15 Claims, 11 Drawing Sheets

(56) References Cited

U.S. PATENT DOCUMENTS

| | | | |
|---|---|---|---|
| 10,170,237 | B2 | 1/2019 | Ginglseder et al. |
| 10,431,373 | B2 | 10/2019 | Narayanan et al. |
| 10,504,641 | B2 * | 12/2019 | Lu ............................ H01F 3/10 |
| 2003/0030529 | A1 | 2/2003 | Min et al. |
| 2004/0222873 | A1 * | 11/2004 | Toyomura ............... H01F 38/00 336/182 |
| 2006/0250207 | A1 * | 11/2006 | Shudarek ................ H01F 27/24 335/297 |
| 2009/0295524 | A1 * | 12/2009 | Silva ..................... H01F 27/346 336/212 |
| 2009/0315663 | A1 * | 12/2009 | Kiyono ................... H01F 37/00 336/219 |
| 2010/0109826 | A1 * | 5/2010 | Sano ....................... H01F 17/06 336/83 |
| 2012/0188048 | A1 * | 7/2012 | Hughes ................. H01F 27/263 336/212 |
| 2014/0191839 | A1 | 7/2014 | Sato et al. |
| 2018/0005748 | A1 * | 1/2018 | Hozoji .................... H01F 27/24 |
| 2018/0174743 | A1 * | 6/2018 | Negrete Hernandez ..................... H05B 6/06 |
| 2018/0261370 | A1 * | 9/2018 | Hirabayashi ............ H01F 27/24 |

FOREIGN PATENT DOCUMENTS

| | | | |
|---|---|---|---|
| CN | 205303125 | U | 6/2016 |
| DE | 202011051056 | | 11/2011 |
| EP | 2924697 | A1 | 9/2015 |
| FR | 2502836 | | 10/1982 |
| JP | H04254308 | A | 9/1992 |
| JP | H0831664 | A | 2/1996 |
| JP | 2003224012 | A | 8/2003 |
| JP | 2006310716 | A | 11/2006 |
| JP | 2007088340 | | 4/2007 |
| JP | 2014207260 | A | 10/2014 |
| RU | 2136461 | C1 | 9/1999 |
| RU | 101264 | U1 | 1/2011 |
| TW | 455893 | B | 9/2001 |

* cited by examiner

CORE FOR INDUCTIVE ELEMENT, AND INDUCTIVE ELEMENT

FIELD OF THE INVENTION

The invention concerns a core for an inductive element with at least a first side part, a middle part and a second side part, wherein the middle part has a central portion, a first edge portion arranged parallel to the central portion, and a second edge portion arranged parallel to the central portion, wherein the central portion is arranged between the first and second edge portions. The invention also concerns an inductive element with a core according to the invention.

BACKGROUND

Cores for inductive elements are produced in numerous different forms. Cores in which the side parts generally have the cross-sectional form of a capital letter E for example can be produced and processed automatically. In this cross-sectional form, the side parts may have special geometric embossing and are known for example as E cores, PQ cores, ETD cores, RM cores etc. If corresponding side parts are wound with comparatively long coils, middle parts are used which then normally have the form of two side parts laid back to back. Such middle parts then have a central portion which for example is formed to be circular cylindrical, a first edge portion arranged parallel to the central portion, and a second edge portion which is designed symmetrically to the first edge portion and also arranged parallel to the central portion. In order for such middle parts to be able to withstand the substantial mechanical loading to which inductive elements with such cores are exposed, for example up to 10 times gravitational force, the first edge portion, the central portion and the second edge portion of the middle parts may be connected together by means of a central web. Such a central web would be designed integrally with the middle part and the two edge portions, so that the middle part forms a stable unit and can be mechanically loaded as heavily as the side parts. From a magnetic aspect, the middle web forms a shunt. A stray capacitance results between two coils of an inductive element.

A core for an inductive element and an inductive element which can be produced and processed automatically will be improved by means of the invention.

SUMMARY

According to the invention, a core with the features of claim 1 is provided for this. Advantageous refinements of the invention arise from the subclaims.

A core according to the invention for an inductive element has at least a first side part, a middle part and a second side part, wherein the middle part has a central portion, a first edge portion arranged parallel to the central portion, and a second edge portion arranged parallel to the central portion, wherein the central portion is arranged between the first and second edge portions. At least one plastic component is provided which is provided at least between the central portion and the first edge portion and/or at least between the central portion and the second edge portion, in order to adjust a stray capacitance of the inductive element and influence a secondary magnetic flux of the inductive element.

By providing the plastic component, the electrical properties and in particular the resonant frequency of an inductive element provided with a core according to the invention may be adjusted. This is achieved by suitable choice of the dielectric constant $\varepsilon_r$ of the plastic used for the plastic component. In comparison with conventional cores for inductive elements, in which the central portion is connected to the first edge portion and the second edge portion by means of a ferritic web, the secondary magnetic flux from the central portion to the two edge portions can also be substantially reduced, and with suitable choice of material of the plastic component, even completely eliminated. In addition, the plastic component may evidently also ensure mechanical stabilisation of the core, in that it provides a mechanical connection between the central portion and the first edge portion and the second edge portion, and in this respect acts as a positioning component.

In a refinement of the invention, a dielectric constant $\varepsilon_r$ of the plastic component lies in the range from 1 to 50, in particular in the range 1 to 10.

In this way, the stray capacitance of an inductive element provided with the core according to the invention may be set within broad limits and thereby also a resonant frequency of such an inductive element may be modified within broad limits.

In a refinement of the invention, the plastic component fixes the first edge portion and the second end portion in a defined position relative to each other.

In this way, the central portion and the two edge portions may be securely fixed to each other and thereby withstand even high mechanical loads. The fixing of the central portion and two edge portions in a defined position relative to each other also allows automatic processing of the core according to the invention into an inductive element.

In a refinement of the invention, the plastic component surrounds the central portion of the middle part at least over part of the length of the central portion.

In this way, a stable mechanical fixing of the central portion may be achieved.

In a refinement of the invention, the plastic component is formed from a plastic with low magnetic permeability.

In this way, it can be ensured that a magnetic shunt through the plastic component is negligible. The relative permeability $\mu_r$ is then 1 or lies in the region of around 1.

In a refinement of the invention, the plastic component is made from silicone, polyimide, isoprene or latex.

In a refinement of the invention, the plastic of the plastic component contains an admixture of carbon, glass granulate, a ceramic compound and/or viscose. A plastic component firstly ensures a high mechanical load-bearing capacity of the core, which is equivalent to or even better than the mechanical load-bearing capacity of middle parts of conventional, integrally produced cores. In relation to the magnetic properties of the core according to the invention, a magnetic shunt can be completely or at least almost completely prevented by the plastic component. Depending on the selection of the plastic used, if a defined magnetic shunt is desired, the size of this magnetic shunt may be set. In relation to the magnetic properties of such a core or such an inductive element, the invention achieves a substantial improvement. In relation to the electrical properties of the core according to the invention, by selection of a suitable plastic, the electrical properties may also be set in a defined fashion. The plastic component may advantageously be produced by means of injection moulding or a hot-melt or melt-adhesive process.

In a refinement of the invention, the plastic component is formed as a plate-like or board-like web arranged perpendicularly to the central portion of the middle part, the first edge portion and the second edge portion, and comprises three passage openings for receiving the central portion, the first edge portion and the second edge portion.

In this way, the central portion and the two edge portions may very easily be attached to the plastic component. In particular, automatic production of the middle part is possible.

In a refinement of the invention, a first of the three passage openings is adapted to the cross-section of the central portion of the middle part, a second of the three passage openings is adapted to the cross-section of the first edge portion of the middle part, and a third of the three passage openings is adapted to the cross-section of the second edge portion of the middle part.

In this way, the central portion and the two edge portions may be securely attached to the plastic component.

In a refinement of the invention, the middle part, the first edge portion and/or the second edge portion, are fixed by clamping in the respective passage opening of the plastic component.

In this way, the middle part and the two edge portions can be fixed in the plastic component by simple insertion of the middle part and the two edge portions in the passage openings of the plastic component.

In a refinement of the invention, the first side part and the second side part generally have a cross-section of similar form to the letter E.

Such side parts of cores are usually known as E cores, PQ cores, ETD cores or RM cores etc., and are very advantageous in relation to their mechanical, electrical and magnetic properties. Such cores may also be produced and processed automatically, in particular wound and made up into inductive elements.

In a refinement of the invention, the plastic component has a base plate from which a plate-like or board-like web protrudes perpendicularly, wherein the base plate is provided for fixing the first side part and second side part of the core.

In this way, by means of the plastic component in its function as a positioning component, not only is the middle part fixed to the central portion and the two edge portions, but also the two side parts of the core are fixed. This is extremely advantageous in particular with respect to automated production of an inductive component with the core according to the invention.

In a refinement of the invention, on its side facing away from the plate-like web, the base plate is provided with fixing means, in particular latching means or clamping means.

Such fixing means may be used for fixing the core or a completed inductive element with the core according to the invention.

The problem on which the invention is based is also solved by an inductive element with a core according to the invention, wherein the inductive element comprises at least one coil which at least partially surrounds the central portion of the middle part.

Such an inductive element has as high a mechanical load-bearing capacity as inductive elements with conventional cores, but from a magnetic aspect has the considerable advantage that no magnetic shunt is created through the middle part, or a magnetic shunt can be set in a defined fashion by suitable selection of a plastic for the plastic component. In addition, the inductive element can be produced fully automatically.

In a refinement of the invention, a dielectric constant of the plastic of the plastic component is matched to an inductance of the coil in order to obtain a defined resonant frequency of the inductive component.

The dielectric constant $\varepsilon_r$ may be set by selection of the plastic of the plastic component. For example, when using silicone $\varepsilon_r$=2.9, when using polyimide $\varepsilon_r$=1.7, when using isoprene $\varepsilon_r$=2.1, and when using latex $\varepsilon_r$=24. If the plastic of the plastic component contains admixtures such as for example carbon, glass granulate, ceramic compounds or viscose, the dielectric constant of the plastic may be set within even wider ranges. For example, for carbon $\varepsilon_r$=2.5, for glass granulate $\varepsilon_r$=4.0, for ceramic compound $\varepsilon_r$=17 and for viscose $\varepsilon_r$=34.5.

In particular in relation to the electrical properties of the inductive element, the invention thus offers substantial advantages in comparison with conventional inductive elements. The resonant frequency of the inductive element can be adjusted according to the invention, so that the working range of the inductive element may be varied in flexible fashion.

BRIEF DESCRIPTION OF THE DRAWINGS

Further features and advantages of the invention arise from the claims and the following description of a preferred exemplary embodiment of the invention in connection with the drawings. The drawings show:

DETAILED DESCRIPTION

Figure 1:
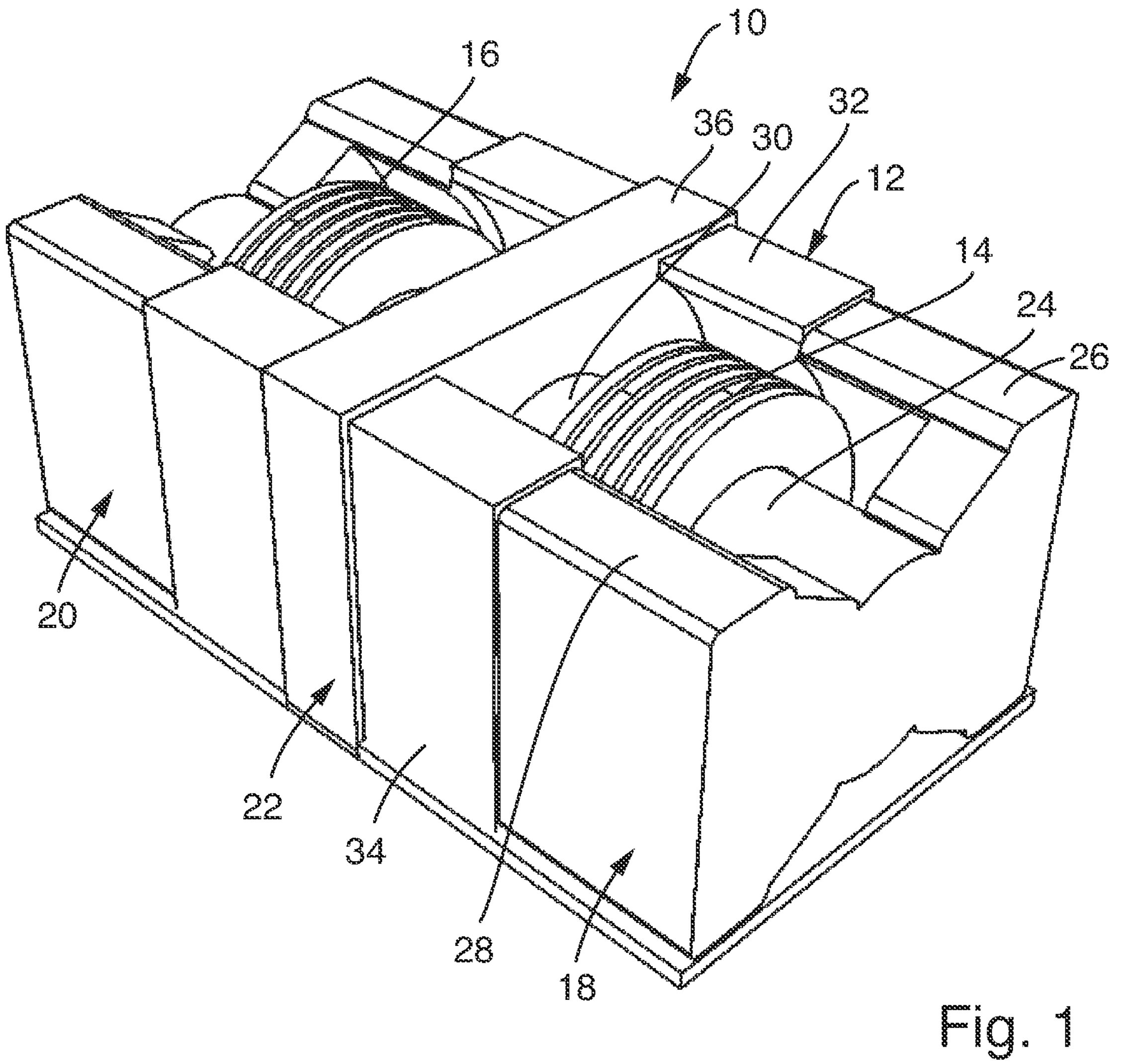
FIG. 1: an inductive element according to the invention in a view from obliquely above.

FIG. 1 shows an inductive element 10 according to the invention in a view from obliquely above. The inductive element 10 has a core 12 and two coils 14, 16. The two coils 14, 16 are each wound from flat wire with rectangular cross-section, wherein a narrow side of the rectangular cross-section points towards the middle longitudinal axis of the two coils 14, 16.

The core 12 has a first side part 18, a second side part 20 and a middle part 22. The two side parts 18, 20 are formed identically and have the form of a so-called PQ core. Viewed in cross-section, wherein a sectional plane then runs halfway up the inductive element 10 in FIG. 1 and contains the middle longitudinal axis of the two coils 14, 16, the two side parts 18, 20 have the cross-sectional form of a capital letter E. A middle portion 24 is configured to be circular cylindrical and thus adapted to the inner form of the two coils 14,

16. The two edge portions 26, 28 each have a flat outer face and a convexly curved inner face, which in turn is adapted to the outer form of the two coils 14, 16.

The middle part 22 has a central portion 30, a first edge portion 32 and a second edge portion 34, and a plastic component 36. The two edge portions 32, 34 are formed identically to each other and each have a flat back side and a convexly curved inner side. The convexly curved inner sides are each adapted to the outer form of the two coils 14, 16. The two edge portions 32, 34 each connect the edge portions 26, 28 of the two side parts 18, 20 and substantially continue their shape. In FIG. 1, the edge portions 32, 34 and the side parts 18, 20 are shown in simplified form. In reality, the side faces of the edge portions 32, 34 and the side parts 18, 20 may align, i.e. transform into each other without a shoulder.

The central portion 30 is formed to be circular cylindrical and connects the middle portions 24 of the two side parts 18, 20.

Figure 2:
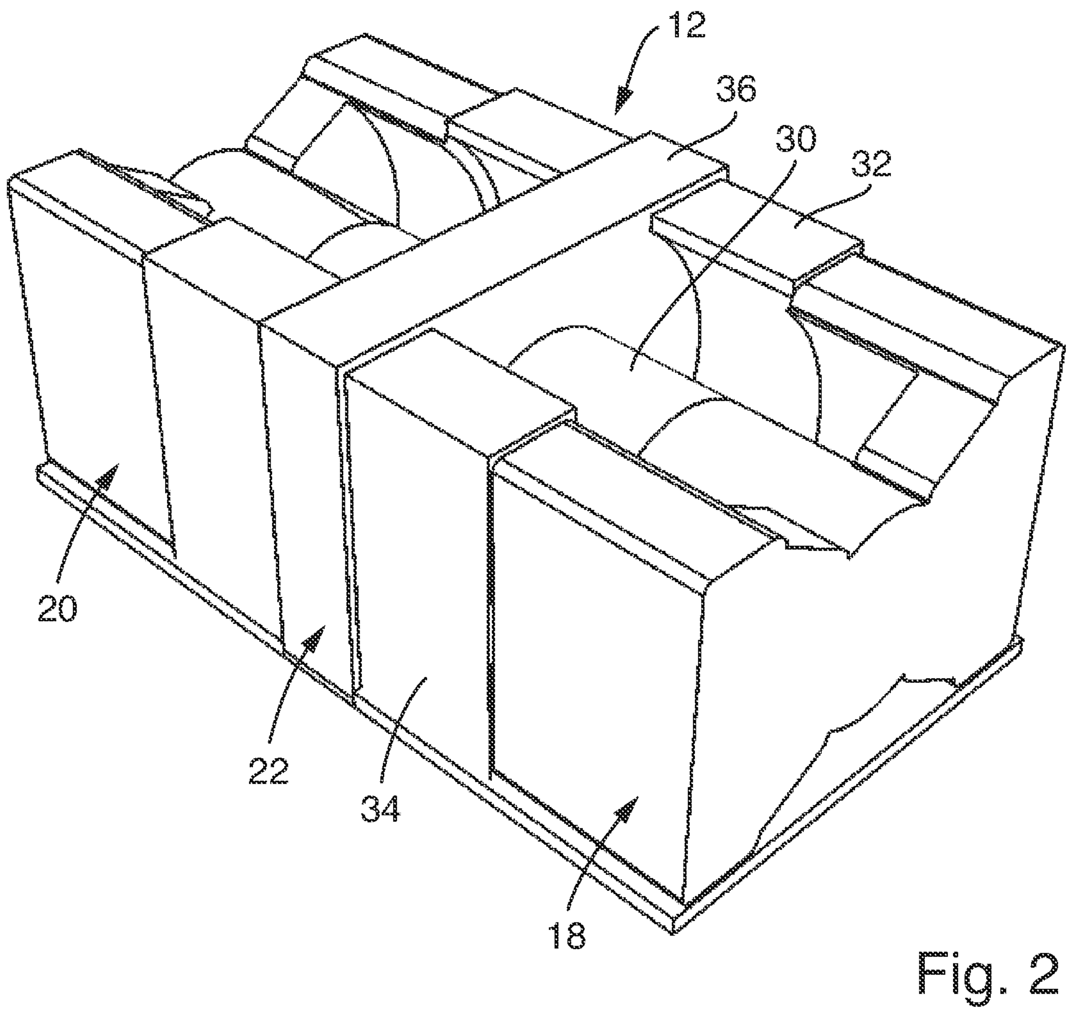
FIG. 2: a depiction of the core of the inductive element from FIG. 1, FIG. 3: the core from FIG. 2, wherein the plastic component of the core has been omitted.

In FIG. 2, the core 12 of the inductive element 10 in FIG. 1 is shown in a view from obliquely above. The core 12 has the two side parts 18, 20 and the middle part 22. As clearly evident in FIG. 2, the middle part 22 connects the two side parts 18, 20.

The two side parts 18, 20 consist for example of a ferritic material and are each produced integrally. In the middle part 22, the central portion 30 and the two edge portions 32, 34 are made of ferritic material. The plastic component 36 or positioning component consists of a plastic, preferably silicone or polyimide.

There is no measurable air gap between the end faces of the two side parts 18, 20 and the middle part 22 lying against each other, since the two side parts 18, 20 rest on the respective assigned end faces of the central portion 30 or first edge portion 32 and second edge portion 34, respectively. From a magnetic aspect however, a small air gap is present which is caused by slight unevenness in the respective end faces. To adjust the magnetic properties of the inductive component 10, an air gap may be deliberately set between the two side parts 18, 20 and the middle part 22. An air gap also means a gap which is created by inserting a small plastic plate between the two side parts and the middle part 22.

Figure 3:
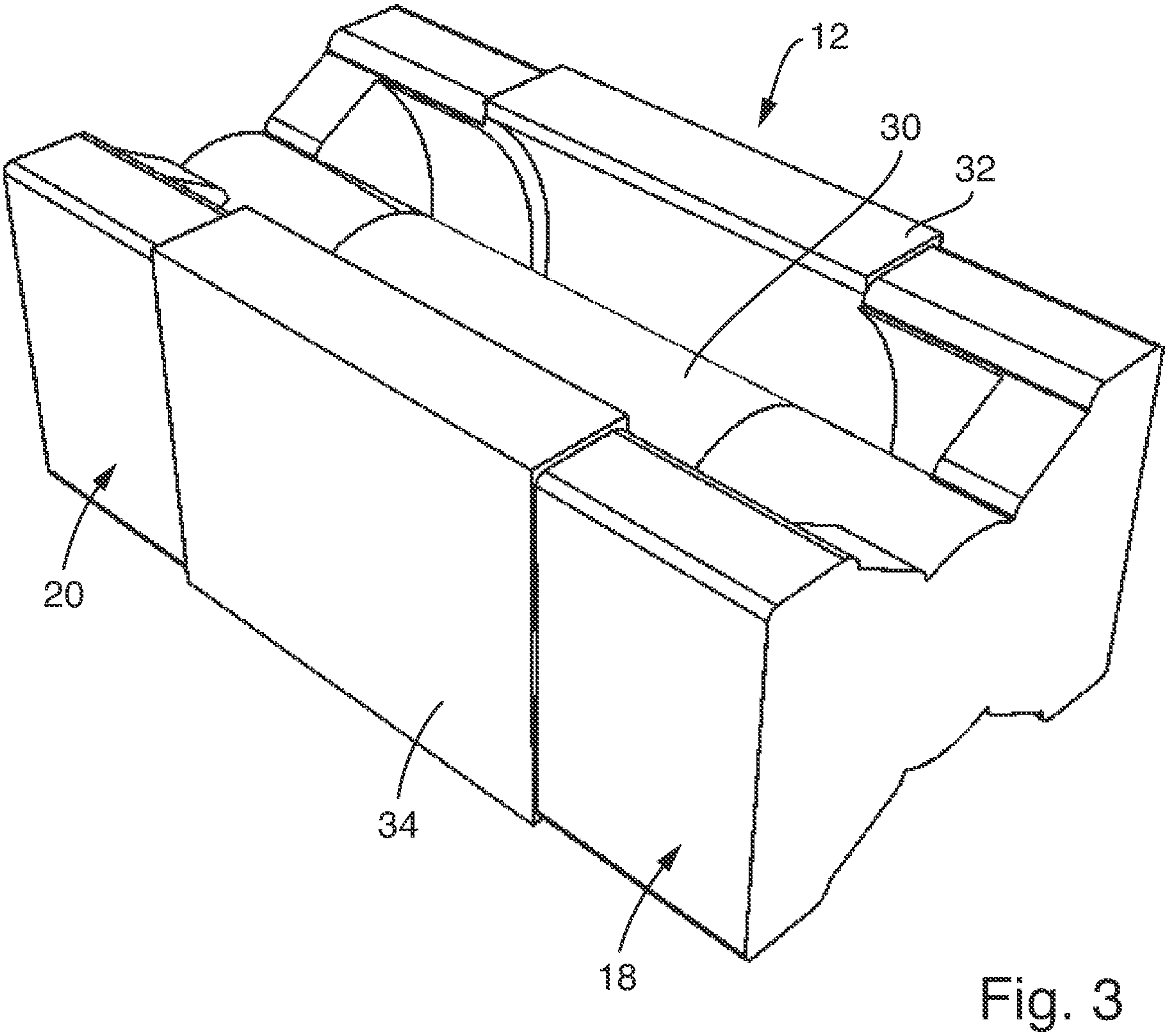

FIG. 3 shows only the components of the core 12 made of ferritic material, namely the two side parts 18, 20, and the central portion 30, the first edge portion 32 and second edge portion 34 of the middle part.

Figure 4:
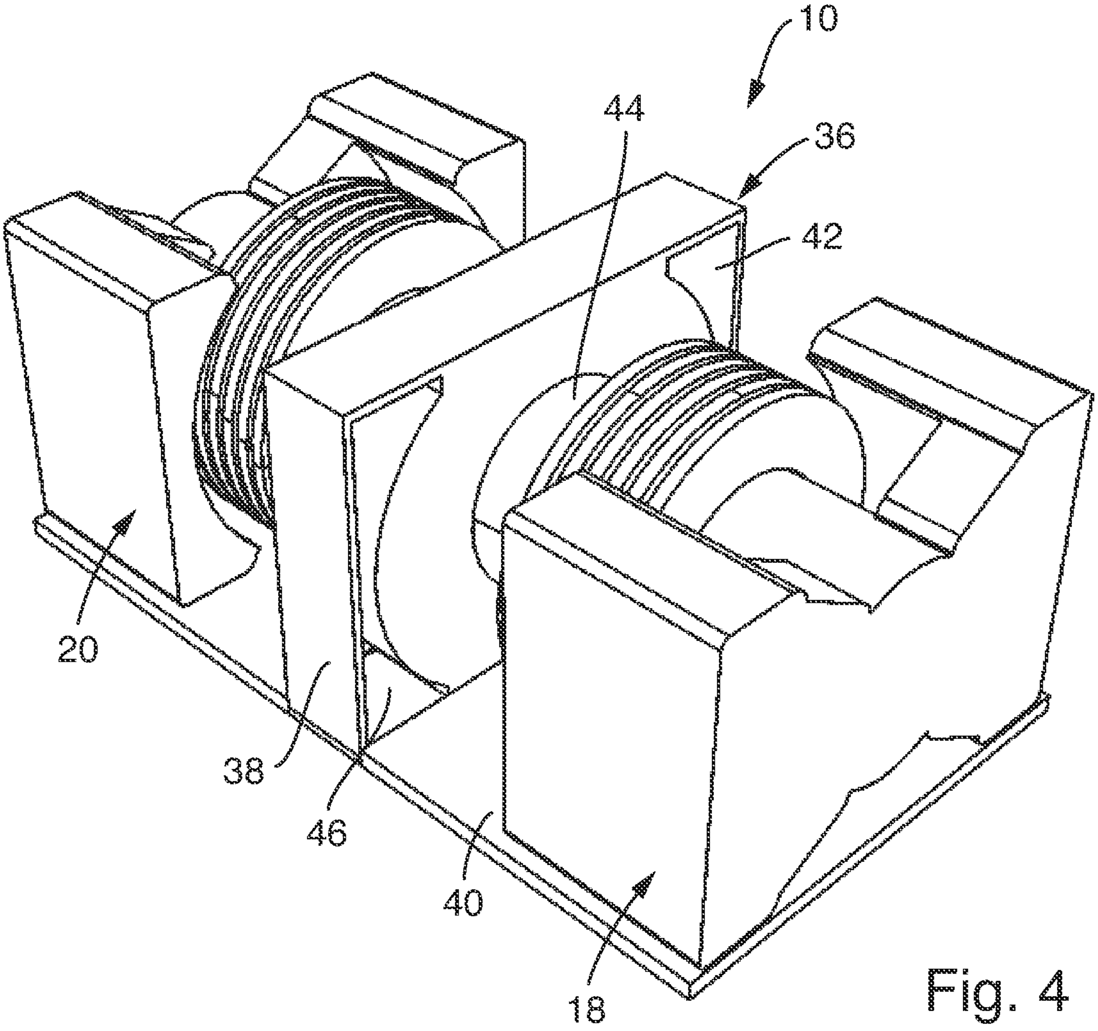
FIG. 4: a depiction of the inductive element from FIG. 1, wherein the central portion and the two edge portions of the middle part of the core are not shown.

FIG. 4 shows the inductive element 10 from FIG. 1, wherein the central portion, the first edge portion and the second edge portion of the middle part have been omitted. It can be seen from this view that the plastic component 36 has a plate-like web 38 protruding perpendicularly from a base plate 40. Both the plate-like web 38 and the base plate 40 are made from a plastic. The plate-like web 38 has a total of three passage openings 42, 44 and 46. The second passage opening 44 is circular cylindrical and adapted to the cross-section of the central portion 30. The first passage opening 42 and third passage opening 46 are adapted to the cross-section of the first edge portion 32 and second edge portion 34, respectively.

The passage openings 42, 44, 46 are each configured such that the central portion 30 is held by clamping in the second passage opening 44, the first edge portion 32 is held by clamping in the first passage opening 42, and the second edge portion 34 is held by clamping in the third passage opening 46, see FIG. 1. By means of the plastic component 36 in its function as a positioning component, the central portion 30, the first edge portion 32 and the second edge portion 34 can thereby be fixed relative to each other.

The base plate 40 may in turn be used to position and fix the two side parts 18, 20 relative to each other and relative to the middle part of the core, in particular the platform-like web 38 of the plastic component 36.

Fixing means, such as for example latching means, may be provided on an underside of the base plate 40 (not shown in FIG. 4) in order to attach the completed inductive component to a carrier, for example a housing or also a circuit board.

Figure 5:
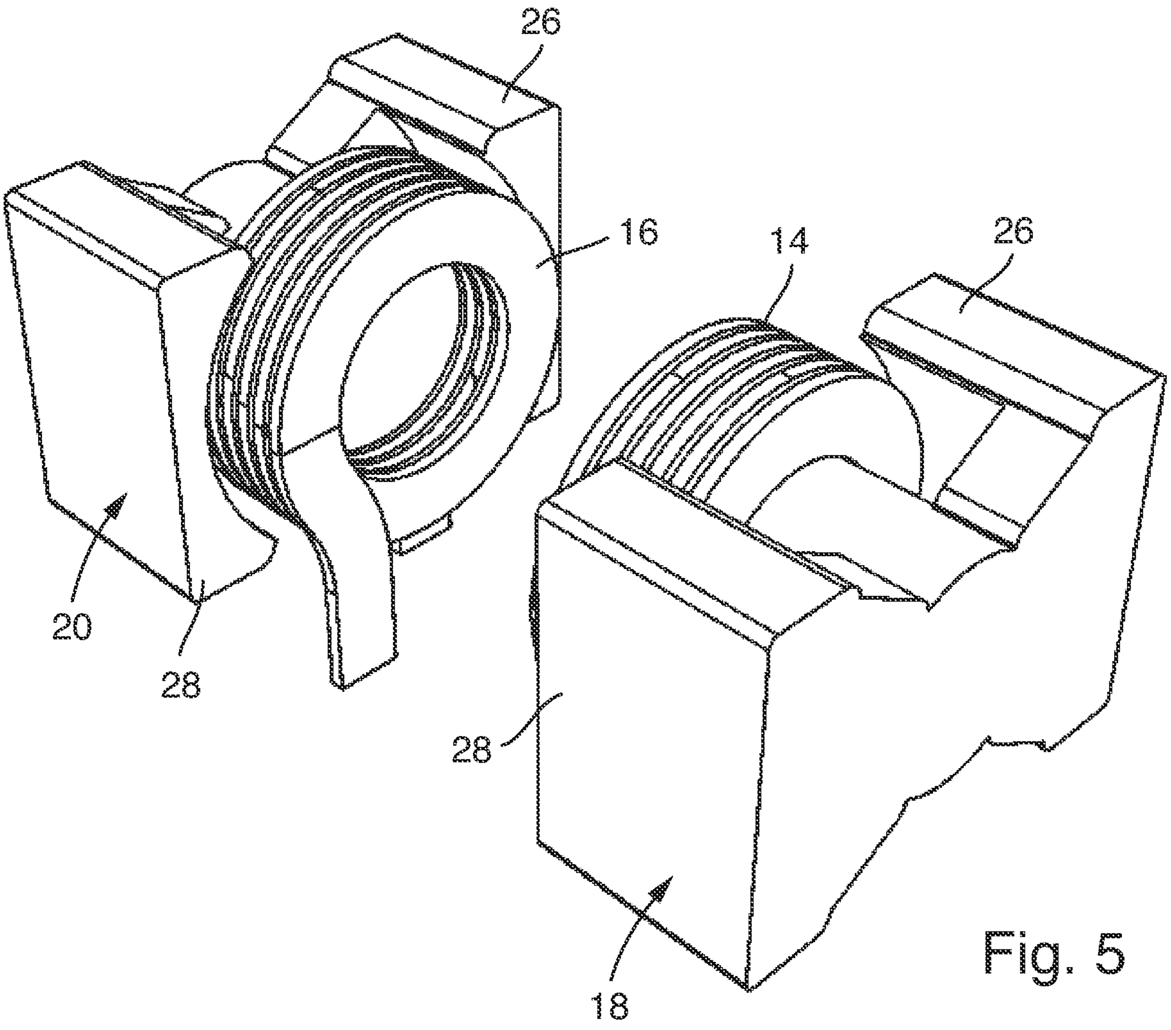
FIG. 5: the inductive element from FIG. 4, wherein the plastic component of the core is not shown.

FIG. 5 shows only the two side parts 18, 20 with the two coils 14, 16. The coil 14 partially surrounds the middle portion of the first side part 18, and the coil 16 partially surrounds the middle portion of the second side part 20. In the view in FIG. 5, it is also clearly evident that the convex inner sides of the edge portions 26, 28 are adapted to the outer form of the coils 14 and 16.

Figure 6:
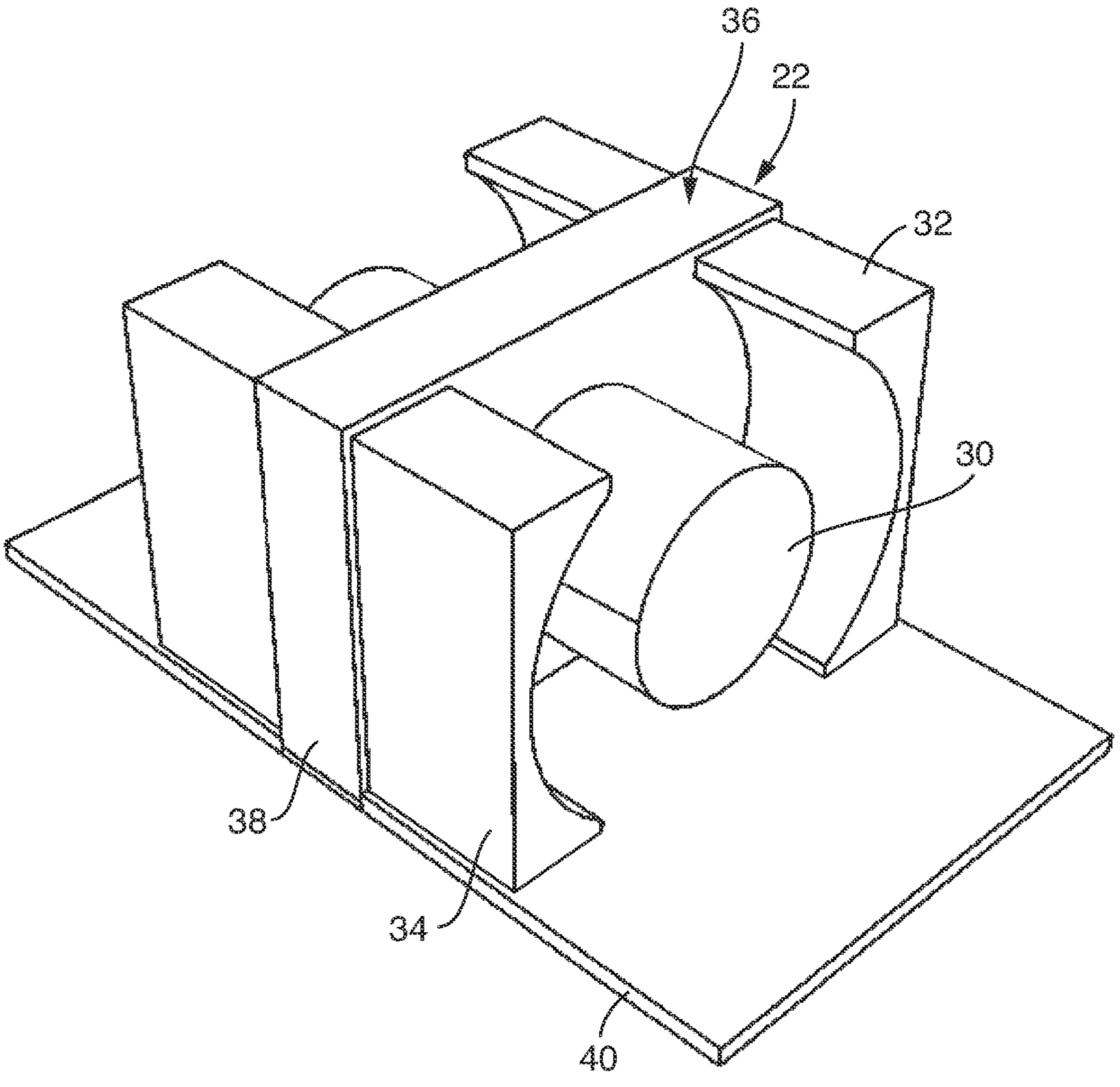
FIG. 6: the central part of the core from FIG. 2, FIG. 7: the plastic component of the core from FIG. 2, FIG. 8: a platform-like web of the plastic component from FIG. 7, FIG. 9: the platform-like web from FIG. 8 in a view from the front.

FIG. 6 shows the middle part 22 of the core in FIG. 2 with the plastic component 36 comprising the plate-like web 38 and the base plate 40. The first edge portion 32, the central portion 30 and the second edge portion 34 of the middle part 22 are fixed by clamping in the passage openings of the plate-like web 38.

Figure 7:
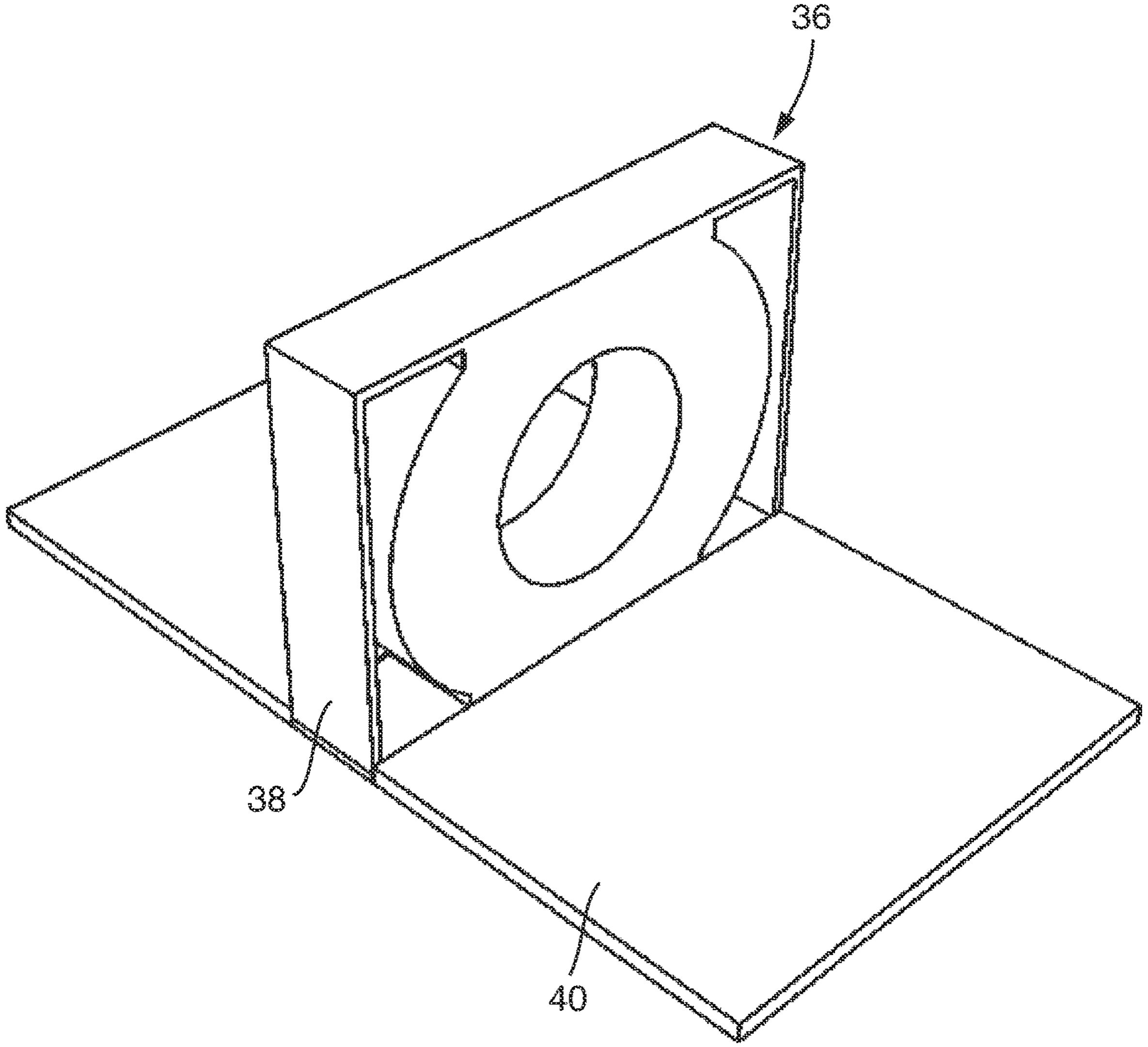
Figure 10:
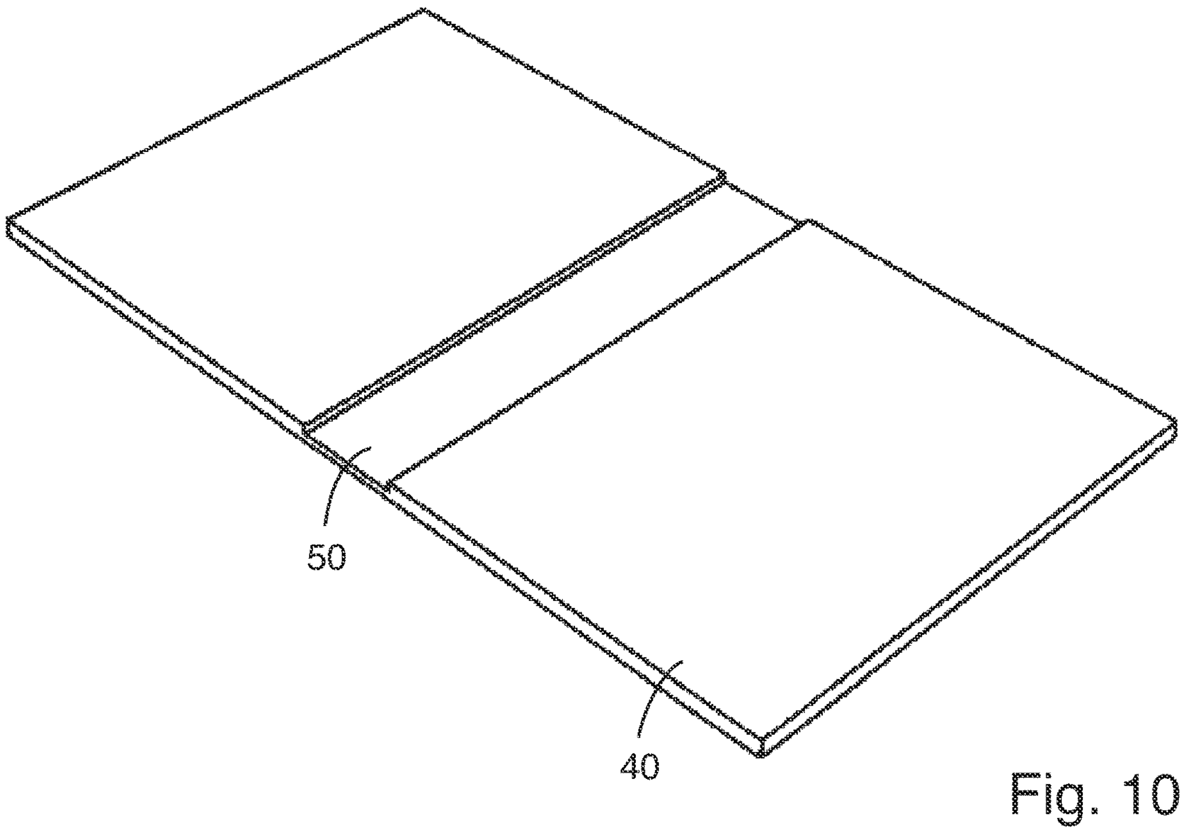
FIG. 10: a base plate of the plastic component from FIG. 7, and FIG. 11: a depiction of a simplified electrical substitute circuit diagram of an inductive element according to the invention.

FIG. 7 shows the plastic component 36 alone. The plate-like web 38 is received in a groove 50 of the base plate 40 which can be seen in FIG. 10. The dimensions of the groove 50 are adapted to the dimensions—in particular the thickness—of the plate-like web 38, so that the plate-like web 38 is held for example by clamping in the groove 50.

Figure 8:
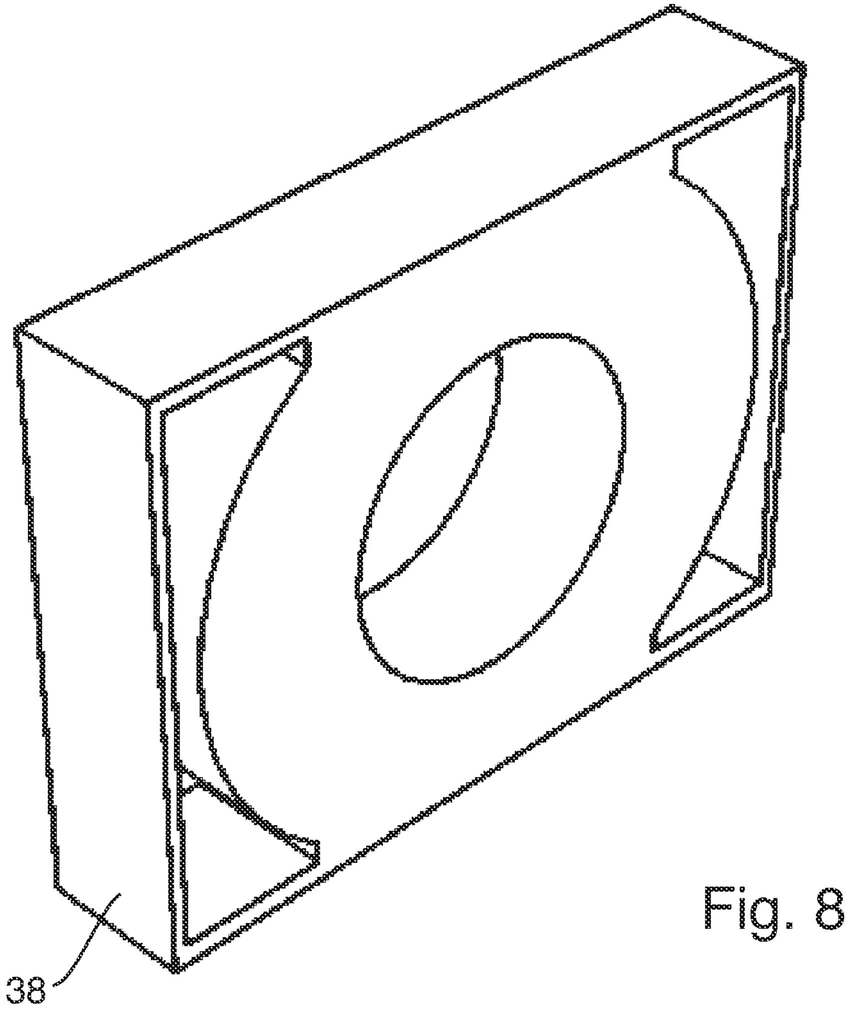
Figure 9:
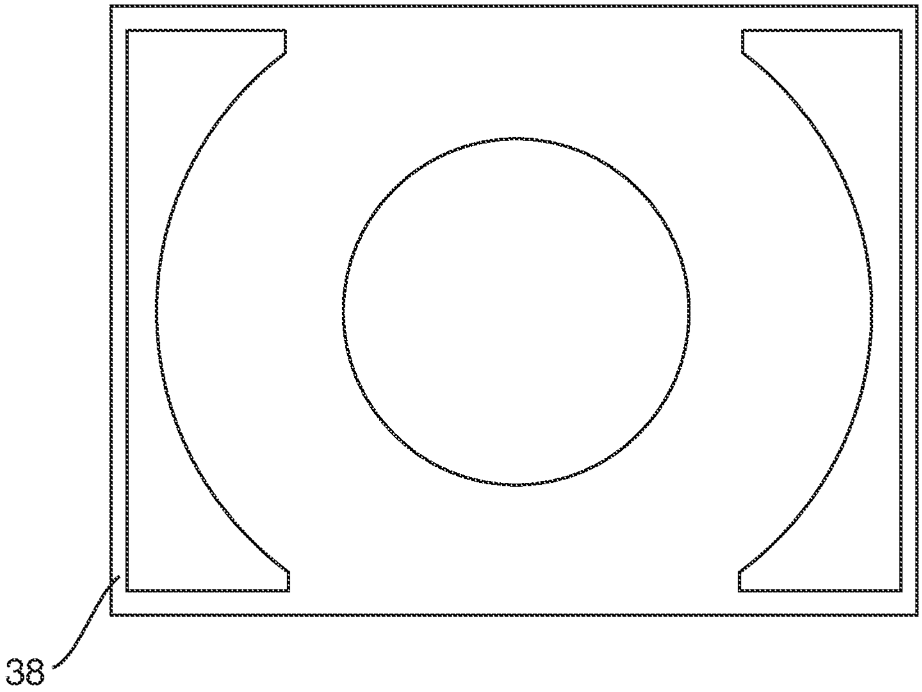

The depictions in FIG. 8 and FIG. 9 show a plate-like web 38 alone from two different angles.

With the core 12 or inductive element 10 according to the invention, it is possible to provide an inductive element which can be produced automatically and also processed automatically. Such an inductive element according to the invention has a mechanical load-bearing capacity which is as high or even higher than conventional inductive elements with a middle part made integrally from ferrite. From a magnetic aspect, a shunt in the middle part can be prevented by the plastic component 36 made of plastic, in particular the plate-like web 38. With suitable choice of plastic, the size of the magnetic shunt can be set to a desired value by the platform-like web 38 of the plastic component 36. For this, ferrite powder may be added to a plastic, for example in production of the plate-like web 38.

From an electrical aspect, the properties of the inductive element according to the invention may also be set by selection of the plastic for the platform-like web 38 of the plastic component 36. The size of a parasitic stray capacitance may be set by the dielectric constant of the plastic of the plate-like web 38, and may be used for example to shift the resonant frequency point of the inductive element 10. This finally leads to different curves of impedance over frequency.

Figure 11:
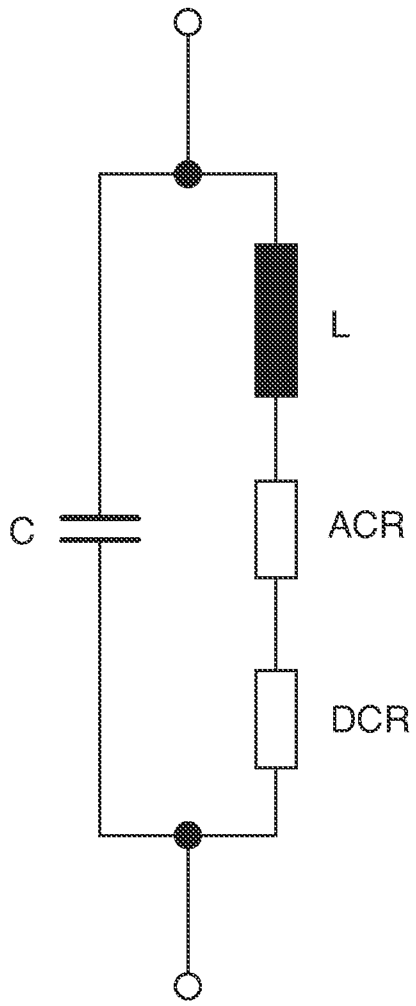

FIG. 11 shows a simplified substitute circuit diagram of an inductive element according to the invention. The substitute circuit diagram has two branches switched in parallel to each other. In the right-hand branch, firstly the inductance L is shown which is determined by the parameters of the coils used, including the number of windings. An alternating current resistor ACR is shown in series to this inductance. This alternating current resistor ACR is dependent on the frequency of the signal applied to the inductive element. The direct current resistor DCR is also shown in series to the inductance in the right-hand branch; in other words, the ohmic resistance of the inductive element, which is determined amongst others by the material used for the coils, its cross-section and wire length.

The left-hand branch of the substitute circuit diagram of FIG. 11 contains a capacitor C. This capacitor C reflects the stray capacitance of the inductive element. This stray capacitance is mainly formed between two coils of the inductive element. In the element according to the invention, the plastic component 36 is inserted between the two coils, see FIG. 1. Thus the stray capacitance C of the inductive element according to the invention can be influenced by the dielectric constant $\varepsilon_r$ of the plastic component 36.

The substitute circuit diagram shown in FIG. 11 however also constitutes a resonance circuit. By selection of the material for the plastic component 36, in other words by selection of the dielectric constant of the plastic of the plastic component 36, the size of the stray capacitance C and hence also the resonant frequency of the inductive element according to the invention can be set. In this way however, also the working range of the inductive element according to the invention may be varied in flexible fashion.

The invention claimed is:

1. A core for an inductive element, comprising at least a first side part, a middle part and a second side part, the middle part including a central portion defining a central portion axis, a first edge portion extending parallel to the central portion axis, and a second edge portion extending parallel to the central portion axis, wherein the central portion is between the first and second edge portions, further wherein the first side part, the middle part and the second side part are positioned in order along the central portion axis; and at least one plastic component configured to receive the first edge portion, the second edge portion and the middle portion therethrough such that the plastic component is at least between the central portion and the first edge portion and/or at least between the central portion and the second edge portion, in order to adjust a stray capacitance of the inductive element by suitable choice of the dielectric constant $\varepsilon_r$ of the plastic used for the plastic component and to influence a secondary magnetic flux of the inductive element by suitable choice of the relative permeability $\mu_r$ of the plastic used for the plastic component, wherein the plastic component is formed as a plate-like or board-like web arranged perpendicularly to the central portion of the middle part, the first edge portion and the second edge portion, and comprises three passage openings for receiving the central portion of the middle part, the first edge portion and the second edge portion.

2. A core according to claim 1, characterized in that a dielectric constant of the plastic component lies in the range from 1 to 50, in particular in the range 1 to 10.

3. A core according to claim 1, characterized in that the plastic component is formed from a plastic with low magnetic permeability.

4. A core according to claim 1, wherein the plastic component is made from silicone, polyamide, isoprene or latex.

5. A core according to claim 1, wherein the plastic contains an admixture of carbon, glass granulate, a ceramic compound and/or viscose.

6. A core according to claim 1, wherein the plastic component fixes the central portion, the first edge portion and the second edge portion in a defined position relative to each other.

7. A core according to claim 1, wherein the plastic component surrounds the central portion of the middle part at least over part of the length of the central portion.

8. A core according to claim 1, wherein a first of the three passage openings is adapted to the cross-section of the central portion of the middle part, a second of the three passage openings is adapted to the cross-section of the first edge portion, and a third of the three passage openings is adapted to the cross-section of the second edge portion.

9. A core according to claim 8, wherein the central portion of the middle part, the first edge portion and/or the second edge portion are fixed by clamping in the respective passage opening.

10. A core according to claim 1, wherein the first side part and the second side part generally have a cross-section of similar form to the letter E.

11. A core according to claim 10, wherein the first side part and the second side part are formed as an E core, PQ core, ETD core or RM core.

12. A core according to claim 1, wherein the plastic component has a base plate from which a plate-like or board-like web protrudes perpendicularly, wherein the base plate is provided for fixing the first side part and the second side part of the core.

13. A core according to claim 12, wherein on its side facing away from the plate-like or board-like web, the base plate is provided with fixing means, in particular latching means or clamping means.

14. An inductive component with a core according to claim 1 and at least one coil which at least partially surrounds the central portion of the middle part.

15. An inductive component according to claim 14, wherein a dielectric constant of the plastic of the plastic component is matched to an inductance of the coil in order to obtain a defined resonant frequency of the inductive component.

* * * * *